(No Model.)

J. T. HAWKINS.
VALVE FOR PNEUMATIC PIPES OR TUBES.

No. 413,941. Patented Oct. 29, 1889.

Witnesses:
G. J. Fenwick
Francis P. Reilly

Inventor:
John T. Hawkins
by P. M. Voorhees
his Attorney

UNITED STATES PATENT OFFICE.

JOHN T. HAWKINS, OF TAUNTON, MASSACHUSETTS.

VALVE FOR PNEUMATIC PIPES OR TUBES.

SPECIFICATION forming part of Letters Patent No. 413,941, dated October 29, 1889.

Application filed April 29, 1889. Serial No. 309,038. (No model.)

*To all whom it may concern:*

Be it known that I, JOHN T. HAWKINS, of Taunton, in the county of Bristol and State of Massachusetts, have invented a new and useful Improvement in Valves for Pneumatic Pipes or Tubes, which invention is fully set forth and illustrated in the following specification and accompanying drawings.

The object of this invention is to improve upon the method of applying a helical spring to the self-closing of an external valve, for which Letters Patent No. 401,080 were issued on the 16th day of April, 1889, this improvement being to obtain a simpler and cheaper construction, one less liable to deterioration from wear, and to more completely exclude dirt, dust, &c. In said Letters Patent the helical spring is contained in a curved tube or case, in which its constant compression under use causes the spring to rub against the exterior curvature of the case or tube and tends to wear the spring and thus weaken it; also, in said construction, one end of the tube is more completely opened and exposed to the entrance of dust, dirt, &c., and the construction is more complicated and expensive than in this invention.

The invention will first be described in detail, and then particularly set forth in the claim.

Figure 1:
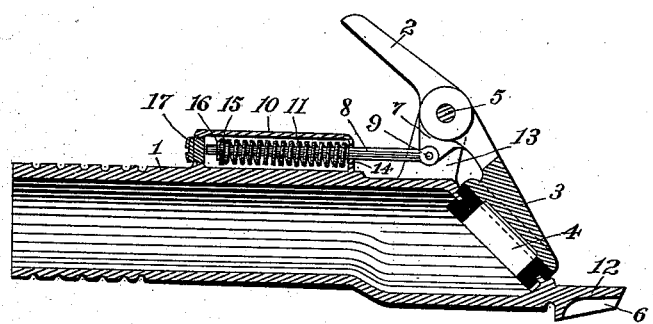
Figure 3:
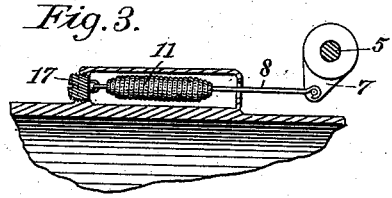
Figure 2:
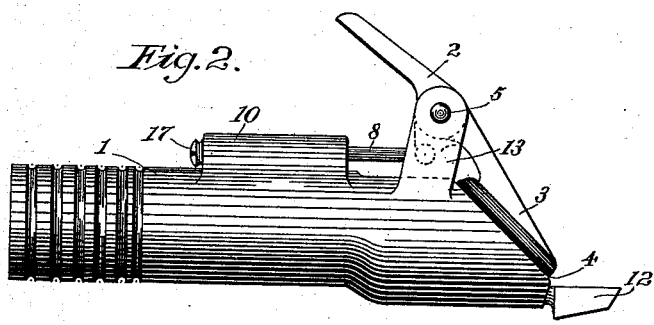

In the accompanying drawings, Figure 1 is a longitudinal section through the center of a valve and pipe, and Fig. 2 shows a side elevation or exterior view of the parts shown in Fig. 1. Fig. 3 shows a modification of spring, hereinafter fully described.

In said figures the several parts are indicated by reference-numbers, as follows:

The number 1 indicates the pipe or coupling carrying the external valve-seat 4, and 10 a small tube cast on or suitably attached to said pipe or coupling 1. Standards 3 are cast on the pipe or coupling 1, in which is fulcrumed by the pin 5 the three-armed lever 2 3 7, the arm 3 being formed into a valve and the arm 2 serving as a handle by means of which the valve may be opened. To the short arm 7 of lever 2 3 7 is articulated a rod 8 by means of a pin 9. The rod 8 passes through an opening 14 in one end of the tube 10, this opening being slightly elongated vertically. Upon rod 8, within tube 4, is placed a helical spring 11, and on the free extremity of rod 8 a washer 15 and pin 16 are placed, by means of which the spring 11 is compressed. The back end of tube 10 is closed by a plug 17 to exclude dust and dirt. The guiding-horn 12 has a recess 6 formed in it, so that it may embrace the short arm 7 of the lever in its component valve.

The spring above described is a compressive one; but, of course, an extension-spring may be used instead, where desired, without departing from the gist of this invention, by connecting the back end of the spring to the plug 17 and the front end directly to the short arm 7 by a suitable rod 8, as shown in Fig. 3.

Having thus fully described my said improvement, as of my invention I claim—

In combination with a valve externally pivoted upon a pipe or coupling, a helical spring inclosed within a tube or case formed upon or attached to the body of said pipe or coupling and suitably connected to an arm formed upon the valve-lever, whereby the valve is automatically closed by the action of said spring and the spring protected from dust, dirt, or other matters liable to cause wear and deterioration of said spring, substantially as set forth.

JOHN T. HAWKINS.

Witnesses:
ALBERT J. PARK,
FREDERIC E. FISKE.